Sept. 30, 1958       M. E. CHANDLER       2,853,851
              JET ENGINE THRUST CONTROL
Filed April 29, 1948                3 Sheets-Sheet 1
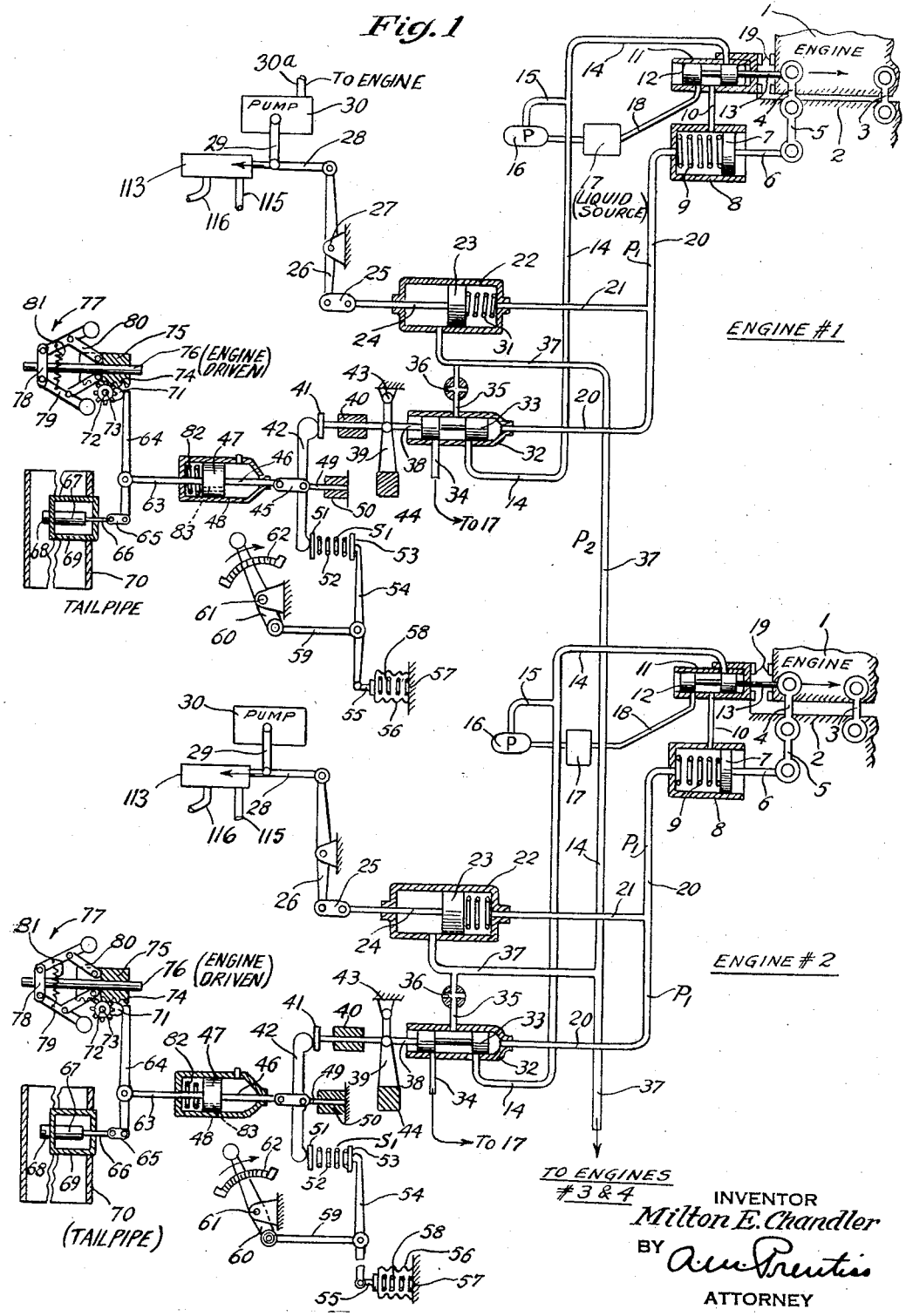
INVENTOR
*Milton E. Chandler*
BY
*A. M. Prentiss*
ATTORNEY

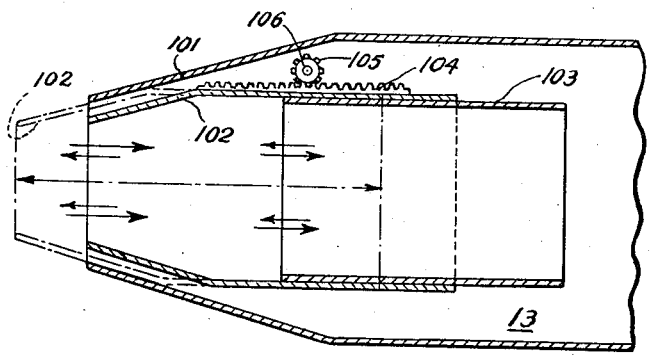
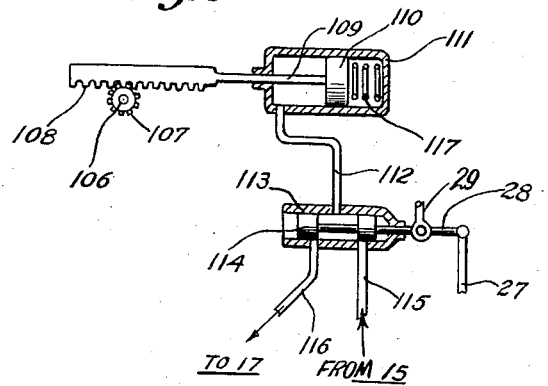

Sept. 30, 1958  M. E. CHANDLER  2,853,851
JET ENGINE THRUST CONTROL
Filed April 29, 1948  3 Sheets-Sheet 3
FIG.4
FIG.5
FIG.6
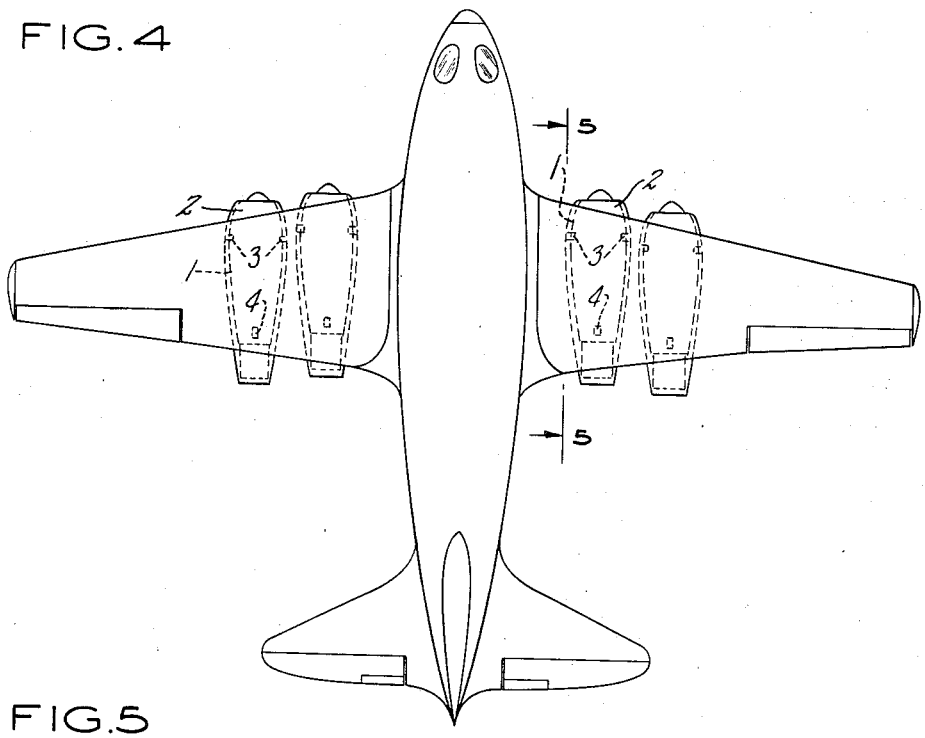
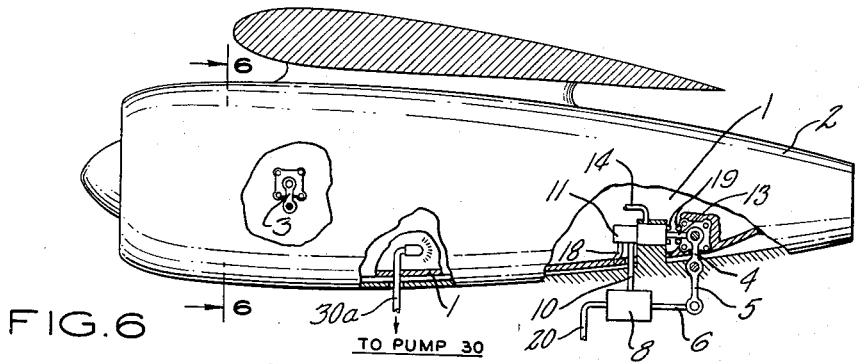
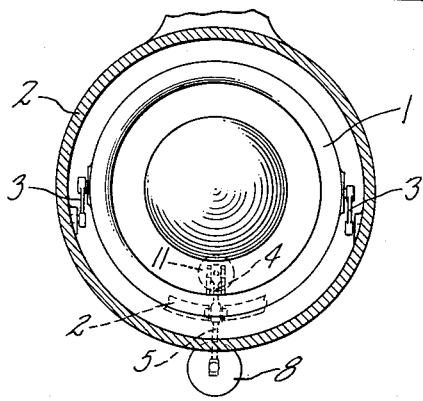
INVENTOR
MILTON E. CHANDLER
BY
ATTORNEY

United States Patent Office 2,853,851
Patented Sept. 30, 1958

2,853,851
JET ENGINE THRUST CONTROL

Milton E. Chandler, New Britain, Conn., assignor, by mesne assignments, to Pratt & Whitney Company, Incorporated, West Hartford, Conn., a corporation of Delaware Application April 29, 1948, Serial No. 23,936

21 Claims. (Cl. 60—35.6)

This invention pertains to automatic controls for jet engines and more particularly has reference to controls for regulating and equalizing the thrusts from the several jet engines of multi-engine aircraft. While this invention is primarily applicable to plain (ram) jet engines, it also applies to turbo-jet engines, either with or without a propeller in which a substantial part of the propelling power of the engine is exerted through the jet effect of its exhaust gases. Unless otherwise qualified, it will be understood that the term "jet engines," as used in this application, includes all of these types of engine.

In the operation of high speed aircraft, propelled by turbo-jet and plain jet engines, it is essential not only that the thrust of each engine be at all times under the control of the pilot, but also in multi-engine aircraft the thrusts from the several engines be equalized and balanced, in order that no yaw moment be developed tending to make the airplane go off course.

In multiple, jet engined aircraft, moving at speeds approaching or perhaps exceeding sonic velocity, small differences in thrust between different engines may cause a material yaw moment to prevail, and in case of a substantial loss of thrust by any engine, the yaw moment, if not rapidly corrected, may result in serious difficulties.

Heretofore, the performance of an aircraft turbo-jet engine with a propeller (prop-jet) has generally been controlled by regulating the speed (R. P. M.) of the engine and/or the pitch of the propeller, so as to maintain a constant speed and/or thrust of propeller for any given setting of the pilot's control lever, and in the turbo-jet aircraft, having no propeller, the performance of the engine has been controlled by regulating the speed of the gas turbine which drives its air compressor, so as to maintain a constant speed of the engine with any given setting of the pilot's control lever. In multi-engine aircraft, with both turbo-jet and prop-jet engines, the aerodynamic balance of the airplane has been controlled by synchronizing the speed (R. P. M.) of the several engines, usually based on the speed of one of the engines selected as a master engine.

With prop-jet engines at the higher speeds when a considerable part of the thrust developed by the engine is due to the jet effect, and with turbo-jet engines at all speeds, experience has shown that the aerodynamic balance of a multiple engine airplane cannot be satisfactorily controlled by synchronizing only the speeds of the several engines, because for the same engine speed the thrust of any engine may vary as much as 10% to 15%, depending upon the operating characteristics and condition of the particular engine. Accordingly, in order that a multi-engine airplane may fly a straight course, it is necessary to balance the thrusts of the several engines and to maintain this balance at all times, preferably without manual manipulation by the pilot.

Experience has also shown that turbo-jet and plain jet engines may encounter difficulties from excessive engine speeds and temperatures, and it has been customary heretofore to provide each engine with a device responsive to engine speed (R. P. M.) and (tail pipe) temperature which will override the automatic control and limit the speed of the engine to a maximum safe R. P. M. whenever greater speeds and temperatures are developed in the engine. In regulating and equalizing the thrusts of the several jet engines of multi-engine aircraft, it is also desirable to provide means for preventing the overspeeding or overheating of any engine without disturbing the balance of the group.

It is desirable that any one of the several engines of a multi-engine aircraft should be capable of functioning as the master engine so that the pilot may select any engine to function as the master.

Accordingly, an object of this invention is to provide means for controlling the speed of a jet engine airplane by manual selection of the desired thrust from one of a group of jet engines at any airplane speed, with means for automatically varying the selected thrust as a function of altitude.

Another object of this invention is to provide means for automatically controlling the operation of a jet engine from the thrust produced by its exhaust gases, so as to obtain a desired thrust in response to any given setting of the pilot's control lever, within the limits of safe temperature and speed of the engine.

Another object is to provide means for automatically regulating and equalizing the thrusts from a plurality of jet engines in a multi-engine airplane so that no yaw moment will be produced tending to make the airplane go off course.

Another object is to provide means for automatically controlling the operation of a plurality of jet engines of a multi-engine airplane in response to the performance of one of the engines selected as a master engine, so that the thrusts from all the engines is equalized and balanced.

A further object is to provide means whereby the pilot may select any engine of a multi-engine airplane to function as a master engine from which the operation of all the other engines is automatically controlled.

Still another object is to provide a speed and temperature override control device for each engine of a multi-engine airplane which is responsive to the speed and temperature of that engine, so that if the speed or temperature of any engine should exceed a predetermined safe limit, the override device temporarily takes control of that engine and reduces its speed to safe operating limits as determined by the setting of the override control device.

With these and other objects in view which may be incident to my improvements, my invention consists in the combination and arrangement of elements hereinafter described and illustrated in the accompanying drawings in which Fig. 1 shows, in diagrammatic form, one embodiment of my improved control, as applied to an airplane propelled by four jet engines; Fig. 2 is a fragmentary cross section of either the air intake duct or the tail pipe of a jet engine showing, in diagrammatic form, a means of controlling either the entrance of air to the engine or the discharge of exhaust gases therefrom, by varying the cross-sectional area of either the air intake duct or the tail pipe; the solid flow lines indicating the direction of gas flow when the variable means is the exhaust nozzle and the dotted flow lines indicating the direction of air flow when the variable means is used in the air inlet; and Fig. 3 is a cross section of the mechanism for operating the means shown in Fig. 2. Fig. 4 is a plan view of an airplane in which the engines are mounted in accordance with my invention; Fig. 5 is a section on the line 5—5 of Fig. 4 on an enlarged scale; and Fig. 6 is an enlarged cross-section on the line 6—6 of Fig. 5.

Referring to Fig. 1 of the drawings, the reference numeral 1 denotes a jet engine comprising the usual air intake duct at the front, followed in the order named by the air compressor, combustion chamber, gas turbine and tail pipe thru which the exhaust gases are discharged to the rear, in the form of a fluid jet that constitutes part of the propelling thrust of the turbo-jet, and the whole of the propelling thrust, in the plain jet engine.

It will be understood that the embodiment of my invention herein disclosed is shown as applied to a four jet engine aircraft, all the engines being identical and each equipped with identically the same mounting and control apparatus. For brevity and clarity, the Fig. 1 shows only two engines (No. 1 and No. 2); the other two engines (No. 3 and No. 4) being hooked onto the common hydraulic control line as indicated at the bottom of the drawing.

Engine 1 is mounted in the chassis 2 of the airplane by means of a plurality of identical rocker arms 3 and 4 which are pivoted to the frame of the engine 1 and to the chassis 2 of the airplane, as shown in the drawing, so that the engine 1 is free to move, to a limited extent, in a straight line parallel to the longitudinal axis of the engine and the airplane. There are preferably two forward rocker arms 3, located one on each side of the engine near its front end, and one rear rocker arm 4, located on the longitudinal center line of the engine near its rear end, so as to constitute a three-point suspension.

Integral with rocker arm 4 is an arm 5 which is pivotally connected by a link 6 to a piston 7 mounted in an hydraulic recoil cylinder 8 which is fixedly attached to the frame of the airplane. When the engine 1 is in operation, the force of the exhaust gas jet which is discharged to the rear (to the left in the drawing) exerts a reactive thrust on the engine tending to move it in the opposite direction (to the right in the drawing). This thrust and movement of the engine is resisted by a spring 9 and a liquid (oil) under high pressure in cylinder 8, which exert a thrust in an opposing direction on piston 7, link 6, arm 5 and rocker arm 4. Cylinder 8 is connected thru conduit 10 with cylinder 11 of servo valve 12 which is attached by link 13 to the frame of the engine 1 in line with the upper pivot of arm 4. Cylinder 11 is connected by conduits 14 and 15 to a high pressure liquid pump 16 which supplies it with liquid from a source 17 under a pressure of approximately 300 pounds per square inch. Cylinder 11 is also connected to liquid source 17 by a drain pipe 18 which returns liquid from cylinder 11 to source 17. Servo valve 12 is of the conventional spool type, having two cylindrical end portions connected by a center portion of reduced diameter.

Whenever the force of the exhaust gas jet of the engine moves the engine to the right, link 13 moves valve 12 an equal distance in the same direction from its neutral position, as shown in the drawing. Movement of valve 12 to the right uncovers the port in cylinder 11, formed by the end of conduit 14, and permits liquid under pressure from pump 16 to enter the space in cylinder 11 between the ends of valve 12. This liquid also enters cylinder 8 thru conduit 10 until the pressure in cylinder 8 is sufficient to overcome the thrust on piston 7 due to the movement of the engine 1 to the right. When the liquid pressure in cylinder 8 (plus force of spring 9) exceeds the reactive thrust of the exhaust gas jet on engine 1, the engine is moved back to the left until servo valve 12 is restored to its neutral position (as shown in the drawing), and the engine is then in equilibrium with piston 7 in recoil cylinder 8.

Likewise, whenever the reactive thrust of the exhaust gas jet on engine 1 falls to a value less than the liquid and spring force in cylinder 8, piston 7 moves to the right and forces engine 1 to move to the left. This movement also moves servo valve 12 to the left, opening port to drain pipe 18, which permits liquid to escape from cylinder 11 back to source 17. The escape of liquid from cylinder 11 lowers the hydraulic pressure therein and also in cylinder 8 which continues until the liquid pressure in cylinder 8 is overcome by the thrust on piston 7 from engine 1, when piston 7 is pushed to the left by the movement of engine 1 to the right under the superior reactive force of the exhaust gas jet. This movement of the engine also moves servo valve 12 to the right until drain pipe 18 is cut off when further movement of engine 1 to the right is stopped by the hydraulic lock of liquid trapped in cylinders 8 and 11, and the servo valve 12 is restored to its neutral position (as shown in the drawing).

From what has been said above, it is clear that the mechanism described provides a means of keeping engine 1 in a state of dynamic equilibrium with the thrust produced on the airplane by the exhaust gas jet from the engine, and this state of equilibrium will not be disturbed unless there is a change in the reactive pressure of the exhaust gas jet or in the liquid pressure in cylinder 8. It will also be appreciated that the total movement of engine 1 under the maximum variation of the forces acting upon it is very small, being equal to the movement required by servo valve 12 to close communication between cylinder 11 and conduit 14 and open communication between cylinder 11 and drain pipe 18, or vice versa. This need be only a few hundredths of an inch. In order to limit the further movement of the engine, in the event of failure of the mechanism described above, resilient buffers 19 are provided between the end of the engine 1 and the cylinder 11 of the airplane.

Cylinder 8 is connected by conduits 20 and 21 with cylinder 22 containing a piston 23, connected by rod 24 and link 25 to a lever 26 which is mounted on a fixed pivot 27 and is connected at its other end by a link 28 to the operating arm 29 of a variable delivery fuel pump 30 which supplies engine 1 with liquid fuel. Cylinder 22 also contains a spring 31 which acts on piston 23 in a direction to oppose the pressure of liquid in the other end of the cylinder.

Conduit 20 connects cylinder 8 with cylinder 32 of servo valve 33, and cylinder 32 is also connected thru conduits 14 and 15 with pump 16 and thru drain pipe 34 to liquid source 17. A conduit 35, having a manual cut-off valve 36, connects cylinder 32, thru conduits 37, with cylinders 22 of control apparatus for Engine No. 1, and with similar cylinders 22 of control apparatuses for Engines No. 2, No. 3 and No. 4. Attached to servo valve 33 is a rod 38 which is slidably mounted in fixed sleeve 40, is pivotally connected near its mid-portion with a swinging lever 39, and carries at its other end a disc 41 which contacts the upper end of a floating lever 42. Lever 39 swings from a fixed pivot 43 and carries at its other end a counterweight 44.

Lever 42 is pivotally connected near its center thru a link 45 and rod 46 with a piston 47 which is slidably mounted in a cylinder 48. Link 42 is also pivotally connected to a stem 49 which is slidably mounted in fixed sleeve 50. At its lower end, lever 42 bears against a disc 51 which is held in contact by a spring 52 reacting against a disc 53 in contact with the upper end of a lever 54 which is pivotally connected at its lower end with a rod 55 attached to a barometric bellows 56 mounted on a fixed base 57. Bellows 56 contains a spring 58 which opposes the action of spring 52 at the other end of lever 54, and is filled with a fluid responsive to temperature and atmospheric pressure which expands and extends the bellows with increasing temperature and decreasing pressure of the atmosphere, so as to compensate the action of the control apparatus for changes of the density of the atmospheric with altitude of the airplane. Lever 54 is connected by a link 59 with a pilot's control lever 60 which is pivotally mounted on fixed pivot 61 and is adapted to engage a quadrant sector 62 graduated to show the total jet thrust in pounds of Engine No. 1, which is one-fourth of the combined jet thrust of all four engines.

Piston 47 in cylinder 48 is connected by rod 63 to a floating lever 64 which is also connected at its lower end thru a link 65 and stem 66 with a cylinder 67 which is fixed by a screw 68 to one end of a larger cylinder 69, mounted in the wall of tail pipe 70 of the engine so as to project into the stream of exhaust gases flowing thru said tail pipe. Cylinders 67 and 69 are made of different metals, having substantially different coefficients of thermal expansion, so that when heated by the exhaust gases in tail pipe 70, cylinder 69 expands at a much greater rate than cylinder 67. Hence, as the temperature of the exhaust gases rises, cylinder 69, expanding at a greater rate than cylinder 67, pulls stem 66, link 65 and lower end of lever 64 to the left and conversely with a fall in temperature of the exhaust gases, the lower end of lever 64 is pushed to the right.

The upper end of lever 64 bears against a cam 71, fixed to shaft 72 on which is also fixed a gear pinion 73 that meshes with a toothed rack 74, carried by a sleeve 75, which is slidably mounted on a shaft 76 of fly-ball speed governor 77. Shaft 76 is driven by the engine and carries a fixed collar 78 to which are pivotally attached weighted arms 79 connected by links 80 to sleeve 75. A tension spring 81 connected to arms 79 opposes the centrifugal force tending to open arms 79 upon rotation by shaft 76. As the speed of rotation of the engine increases, arms 79 open and pull sleeve 75 to the left. This movement rotates pinion 73 and cam 71 in a counterclockwise direction which permits the upper end of lever 64 to move to the left.

From the two foregoing paragraphs, it is clear that any increase in the temperature of the exhaust gases in the tail pipe 70, or any increase in the speed of the engine, or any combination of the two, will move lever 64 and with it rod 63 and piston 47 to the left, and vice versa. The left end of cylinder 48 contains a spring 82 which almost balances the minimum thrust on piston 47 due to the action of spring 52 so as to relieve the lever 64 of most of the strain due to the force of spring 52. The strength of lever 64 and the forces exerted by cylinder 69 and cam 71 are sufficient to overcome the additional force exerted by spring 52 when it is compressed beyond its maximum extension. The cylinder 48 is completely filled with a liquid thru a filling hole which is then closed by screw plug. This liquid flows thru a restricted passage 83 in piston 47 until it fills the space to the left of piston. When piston 47 is moved by lever 64 and rod 63, the liquid in cylinder 48 surges back and forth thru passage 83 and thus steadies the movement of the piston and prevents any oscillations thereof.

The control system hereinabove disclosed has been shown and described as controlling the operation of a jet engine by regulating the delivery of a variable capacity fuel pump which supplies fuel to the engine. My control system is not, however, so limited and may be also applied to govern engine operation by varying the cross-sectional area of the air intake duct or the tail pipe of the engine, since it is well known that jet engines may be controlled by so regulating the supply of air to the combustion chamber, or the discharge of exhaust gases therefrom.

A simple mechanism for this purpose is illustrated in Figs. 2 and 3, wherein the reference numeral 13 denotes either the air intake duct or the tail pipe of a jet engine thru which the air enters the engine or the exhaust gases escape therefrom. The full line arrows in Fig. 2 indicate the direction of the discharge of exhaust gases when element 100 is a tail pipe. When 100 is an air intake duct, the flow of air is in the opposite direction, as indicated by dotted arrows. Conduit 100 has an inwardly tapered portion 101 at its rear end in which is concentrically located a similarly tapered choke pipe 102 which is slidably mounted on a fixed cylindrical sleeve 103, located concentrically in the rear cylindrical portion of conduit 100. The cylindrical portion of choke pipe 102 telescopes over sleeve 103 with a free-running but substantially close fit thereon, and is provided on its outer surface with a toothed rack 104 which engages a pinion 105 fixedly mounted on a shaft 106 which extends thru the wall of conduit 100. Outside conduit 100, shaft 106 has also fixed thereon a second pinion 107 (Fig. 3) which engages a toothed rack 108 which is integral with a rod 109 attached to a piston 110 in cylinder 111. Cylinder 111 is connected by a tube 112 to the cylinder 113 of a servo valve 114 which valve is connected by link 28 to lever 26 (Fig. 1). Servo valve cylinder 113 is supplied with operating fluid thru a pipe 115 which connects with conduit 15 (Fig. 1). A drain pipe 116 connects cylinder 113 with fluid source 17 (Fig. 1). Servo valve 114 is of the conventional spool type, having two cylindrical valve portions connected by a mid-portion of reduced cross section.

When link 28, operated by lever 27 of the control apparatus shown in Fig. 1, pushes valve 114 to the left, the port communicating with drain pipe 116 is opened and fluid escapes from cylinder 111, relieving the pressure therein, whereupon a spring 117 in cylinder 111 pushes piston 110, rod 109 and rack 108 to the left. This rotates pinions 107 and 105 in a counterclockwise direction which moves choke pipe 102 to the left. As choke pipe 102 moves to the left, it progressively reduces the cross-sectional area of the passageway between its outer wall and the inner wall of conduit portion 101, until choke pipe 102 contacts portion 101 as shown in dotted lines in Fig. 2, whereupon the total cross-sectional area of conduit 100 is reduced to the cross-sectional area of the end of choke pipe 102. Conversely, when lever 27 moves servo valve 114 to the right, choke pipe 102 is moved to the right and withdrawn within conduit 100 until the discharge ends of both are in the same plane, as shown in Fig. 2, at which point the cross-sectional discharge area of the conduit is a maximum. Since the propelling thrust of a jet motor is a function of the cross-sectional area of the jet of exhaust gases, the thrust of the engine may be varied and controlled by regulating the cross-sectional area of the tail pipe thru which the exhaust gases are discharged, as indicated above.

Also, since the thrust of a jet engine is a function of the mass air flow thru the engine, the thrust of the engine may be varied and controlled by regulating the cross-sectional area of the air intake duct of the engine. This may be accomplished in the same manner as just described for regulating the cross-sectional area of the tail pipe, by applying the same control mechanism to the air intake duct instead of the tail pipe. Irrespective of which application of this control mechanism is used, the fuel supply to the engine is regulated on the mass air or gas flow thru the engine, so as to maintain a proper mixture under all operating conditions. This is accomplished by a fuel control mechanism responsive to the pressure either in the air intake duct or the tail pipe, depending upon the point at which the mass air or gas flow is regulated, as disclosed in U. S. application of Leighton Lee II, Serial No. 746,975, filed May 9, 1947, now Patent No. 2,675,674.

Operation of control

The principles of operation of the control for jet engines herein disclosed are as follows:

(1) The desired thrust to be imparted to the aircraft by the engine jet is selected by positioning a pilot's manual lever (60) of say Engine No. 1, selected as the master engine.

(2) The positioning of the manual lever determines the magnitude of the pressure in a liquid line (37).

(3) The thrust produced by each engine is compared with the pressure existing in the liquid line.

(4) Any inequality between the existing thrust and the desired thrust is corrected by a closed cycle servo-mechanism which acts on the engine control mechanism to increase or decrease the engine output until the existing thrust equals the desired thrust.

(5) The individual thrusts of the several jet engines of a multi-engine aircraft are similarly automatically regulated so as to equal and balance each other, thereby eliminating any yaw moment on the aircraft tending to make it go off course.

(6) A maximum speed and temperature override control device is provided for each engine which automatically regulates the speed of rotation of the engine, so that any excess of temperature or speed occurring in any engine is automatically corrected to the safe limit determined by the setting of the override control device without disturbing the operation of any of the other engines.

More specifically, the operation of my improved jet engine control system is as follows:

Operating liquid (preferably isovis oil) is pumped into the system by a high pressure pump 16, driven by each engine, from liquid reservoir 17.

Each engine is mounted on rectilinearly movable supports 3 and 4, and is restrained from relative movement with respect to its airplane by a balancing thrust of the engine against the high pressure liquid in a recoil cylinder 8.

The pressure $P_1$ of the liquid in cylinder 8 is transmitted to one side of a servo valve 33, the other end of which reacts against a spring 52 connected to a pilot's manual lever 60. Servo valve 33 is in neutral at one position only, and hence any movement of the manual lever 60, resulting in a variation of the force $S_1$ of the spring 52, will unbalance the equilibrium of the servo valve 33, permitting liquid to flow to or from the control cylinder 22. This unbalances the control piston 23, permitting it to move and actuate the regulator arm 29 of the fuel pump 30 which regulates the flow of fuel to the engine, or servo valve 114 and which regulates the mass air flow to the engine or the flow of exhaust gases therefrom, any of which will increase or decrease the thrust exerted by the engine. The increase or decrease of engine thrust reacts against recoil cylinder 8, causing a small movement of the engine on its supports 3 and 4, which opens or closes the thrust servo valve 12, admitting or withdrawing high pressure liquid to or from recoil cylinder 8. This admission or withdrawal of liquid in cylinder 8 results in a change of pressure $P_1$, until $P_1$ is sufficient to balance the force of spring 52, when servo valve 33 will assume a neutral position (as shown in Fig. 1), thus hydraulically locking piston 23 in cylinder 22 and preventing any further change in engine position until the equilibrium of servo valve 33 is again upset.

In short, the thrust of the engine, as measured by the travel of servo valve 12, is proportional to the compression of spring 52 as determined by the position of the pilot's manual lever 60. In order to automatically modify the thrust of the engine as a function of altitude, a barometric control 56 is incorporated in the manual lever linkage 59—54, as shown in Fig. 1.

To prevent the overspeeding or overheating of any of the engines in a multi-engine airplane, an automatic override control device is provided on each engine. This device comprises a bimetallic heat sensitive element 67—69, located in the tail pipe of the engine, where it is exposed to the heat of the exhaust gases, and a fly-ball speed governor 77, driven by the engine; both acting thru a linkage (64, 63, 47, 46, 45) on the movable pivot of lever 32, whereby any increase in speed or temperature of the engine over the maximum limits as determined by the setting of adjustable screw 68 of the thermal control, or cam 71 of the speed governor, will move the pivot of lever 42 to the left (in Fig. 1) and thus reduce the compression on spring 52 and the force exerted thereby on servo valve 33. This will cause valve 33 to move to the left, thereby relieving the liquid pressure in control cylinder 22 and thus permit piston 23 to move to the left which moves link 28 to the right and reduces the fuel supply to the engine until the speed and/or temperature of the engine falls to the safe limits, as determined by the setting of the override control device, whereupon the movement of the pivot of lever 42 ceases and the control system is again in normal equilibrium.

Equalization of thrust among all jet engines of a multi-engine aircraft is achieved by the provision of a hydraulic manifold 37, as follows:

(1) Hydraulic cut-off valve 36 is opened on the master engine, say Engine No. 1, and closed on all the other engines.

(2) The thrusts of Engine No. 2, 3 and 4 react each against its respective control piston 23, and in a state of balance the hydraulic manifold pressure $P_2$ must be the same in all control cylinders 22. Hence, also, the thrusts exerted by all the engines on their engine thrust pistons 7 must, in a state of balance, be equal in all engines.

(3) In case of an increase of thrust in say Engine No. 2, which will upset the balance in its engine thrust cylinder 8, forcing its piston 7 toward the left, opening servo valve 12 on Engine No. 2 and admitting liquid under pressure $P_1'$ into conduit 20 of Engine No. 2. This increased pressure $P_1'$ will actuate the control piston 23 of Engine No. 2 to reduce thrust until again the thrust of Engine No. 2 equals that of Engine No. 1.

During this transient condition, the temporary increased pressure against control piston 23 of Engine No. 2 will force liquid through the hydraulic manifold 37 into control cylinder 22 of Engine No. 1, which will force its control piston 23 to the right, and transmit an excess of liquid pressure into recoil cylinder 8, and cause its engine thrust servo valve 12 to increase the thrust of Engine No. 1 temporarily.

(4) In case of an unwanted thrust increase of Engine No. 2, therefore, the thrust of Engine No. 1 (and similarly on Engines No. 3 and No. 4) is somewhat increased momentarily, and then the thrust of all engines is corrected to the desired value as called for by the position of manual control lever 60 of Engine No. 1, thru the equalizing effect of hydraulic manifold 37.

Compensation for forces due to engine mass

The thrust measured by the reaction between the engine supports 3 and 4 and the hydraulic fluid in recoil cylinder 8 is the net thrust of the engine, i. e., the total thrust minus the inertia and weight component forces of the engine. For example, if the airplane is climbing at an angle of inclination $\alpha$ between the engine longitudinal axis and the horizontal plane and is undergoing a linear acceleration "$x$," then the net thrust, as indicated by the hydraulic fluid pressure in recoil cylinder 8, is $$P - W\left(\sin \alpha + \frac{x}{g}\right)$$

where "$P$" is the total thrust of the engine in pounds, "$W$" is the weight of the engine in pounds, and "$g$" is the acceleration due to gravity.

For an engine weighing 2500 pounds, a climbing angle of 30°, and a forward acceleration of 2 feet per second, the thrust, as measured by the hydraulic pressure in recoil cylinder 8, would be below the total engine thrust by $$2500\left(.5 + \frac{2}{32.2}\right) = 1{,}400 \text{ lbs.}$$

This error is too great to be ignored, and would, if uncompenstated, result in an increase in engine thrust during climb and acceleration, and a reduction in engine thrust during descent and deceleration, beyond the value indicated by the position of the pilot's manual control lever 60. Since the effects of engine weight and inertia are in the desired direction and the engine control mechanism would prevent excessive engine speeds and temperatures during maneuvers of the airplane if these effects were not compensated, this characteristic may not be undesirable. However, the pilot will have better control of the airplane if these effects are compensated in the control system and such compensation may be incorporated by introducing a mass into the control system. Such a mass is the counterweight 44 on lever 39. The effective weight "$w$" of the counterweight 44 is $$w = \frac{WKr_1}{r_3}$$

where $W$ = the weight of the engine
$r_1$ = the distance from the pivot of lever 39 to the point of attachment of rod 38
$r_3$ = the distance from the pivot of lever 39 to the center of gravity of weight 44 and $$K = Fr_2 - \frac{w\left(\sin \alpha + \frac{x}{g}\right)r_3}{\left[P - W\left(\sin \alpha + \frac{x}{g}\right)\right]r_1}$$

where $F$ is the force exerted by weight 44 on spring 52 thru rod 38 and lever 42.

The introduction of a mass "$w$" in the form of counterweight 44 thus compensates for the weight and inertia of the engine during climb and acceleration or during descent and deceleration.

While I have shown and described the preferred embodiment of my invention, I do not limit my invention to the constructional details disclosed by way of illustration, as these may be changed and modified by those skilled in the art without departing from the spirit of my invention or exceeding the scope of the appended claims.

I claim:

1. The method of controlling the speed of flight of an aircraft propelled by jet engine, characterized by mounting the engine so that it is movable, relative to said aircraft, in proportion to the reaction thrust of its jet, throughout the range of said movement; and regulating the propulsive power of said engine in accordance with the magnitude of said movement, so that said aircraft is propelled at a definite, selected speed, corresponding to a definite position of said engine relative to said aircraft, throughout the speed range of said aircraft.

2. In an aircraft propelled by a jet engine, means for controlling the speed of flight in accordance with the reaction thrust of the engine jet, comprising; means for mounting the engine so that it is movable relative to said aircraft in proportion to the reaction thrust of its jet, throughout the range of said movement; and means responsive to said movement for regulating the propulsive power of said engine, in accordance with said movement, so that said aircraft is propelled at a definite, selected speed, corresponding to the position of said engine relative to said aircraft, throughout the speed range of said aircraft.

3. In an aircraft propelled by a jet engine, means for controlling the speed of flight in accordance with the reaction thrust of the engine jet, comprising; means for mounting the engine so that it is movable relative to said aircraft in proportion to the reaction thrust of its jet, throughout the range of said movement; and means for regulating the propulsive power of said engine by varying the supply of fuel thereto in accordance with the movement of said engine, so that said aircraft is propelled at a definite, selected speed, corresponding to the position of said engine relative to said aircraft, throughout the speed range of said aircraft.

4. In an aircraft propelled by a jet engine, means for controlling the speed of flight in accordance with the reaction thrust of the engine jet, comprising; means for mounting the engine so that it is movable relative to said aircraft in proportion to the reaction thrust of its jet, throughout the range of said movement; and means for regulating the propulsive power of said engine by varying the supply of air thereto in accordance with the movement of said engine, so that aircraft is propelled at a definite, selected speed, corresponding to the position of said engine relative to said aircraft, throughout the speed range of said aircraft.

5. In an aircraft propelled by a jet engine, means for controlling the speed of flight in accordance with the reaction thrust of the engine jet, comprising; means for mounting the engine so that it is movable relative to said aircraft in proportion to the reaction thrust of its jet, throughout the range of said movement; and means for regulating the propulsive power of said engine by varying the discharge of exhaust gases therefrom in accordance with the movement of said engine, so that said aircraft is propelled at a definite, selected speed, corresponding to the position of said engine relative to said aircraft, throughout the speed range of said aircraft.

6. In an aircraft propelled by a jet engine, means for controlling the speed of flight in accordance with the reaction thrust of the engine jet, comprising; means for mounting the engine so that it is movable relative to said aircraft in proportion to the reaction thrust of its jet, throughout the range of said movement; and hydraulic means responsive to said movement for regulating the propulsive power of said engine, in accordance with said movement, so that said aircraft is propelled at a definite, selected speed, corresponding to the position of said engine relative to said aircraft, throughout the speed range of said aircraft.

7. In an aircraft propelled by multiple jet engines, means for controlling the speed of flight in accordance with the jet reaction thrust of each engine, comprising; means for mounting each engine so that it is movable relative to said aircraft in proportion to the reactive thrust of its jet, throughout the range of said movement; and means for regulating the propulsive power of all engines in accordance with the movement of one engine selected as a master, so that said aircraft is propelled at a definite, selected speed, corresponding to the position of said engine relative to said aircraft, throughout the speed range of said aircraft.

8. In an aircraft propelled by multiple jet engines, means for controlling the speed of flight in accordance with the jet reaction thrust of each engine, comprising; means for mounting each engine so that it is movable relative to said aircraft in proportion to the reactive thrust of its jet, throughout the range of said movement; and means for regulating the propulsive power of all the engines by varying the fuel supply to each engine in accordance with the movement of one engine selected as a master, so that said aircraft is propelled at a definite, selected speed, corresponding to the position of said engine relative to said aircraft, throughout the speed range of said aircraft.

9. In an aircraft propelled by multiple jet engines, means for controlling the speed of flight in accordance with the jet reaction thrust of each engine, comprising; means for mounting each engine so that it is movable relative to said aircraft in proportion to the reactive thrust of its jet, throughout the range of said movement; and means for regulating the propulsive power of all engines by varying the air supply to each engine in accordance with the movement of one engine selected as a master engine, so that said aircraft is propelled at a definite, selected speed, corresponding to the position of said engine relative to said aircraft, throughout the speed range of said aircraft.

10. In an aircraft propelled by multiple jet engines, means for controlling the speed of flight in accordance with the jet reaction thrust of each engine, comprising; means for mounting each engine so that it is movable relative to said aircraft in proportion to the reactive thrust of its jet, throughout the range of said movement and means for regulating the propulsive power of all engines by varying the discharge of exhaust gases from each engine in accordance with the movement of one engine selected as a master, so that said aircraft is propelled at a definite, selected speed, corresponding to the position of said engine relative to said aircraft, throughout the speed range of said aircraft.

11. In an aircraft propelled by multiple jet engines, means for controlling the speed of flight in accordance with the jet reaction thrust of each engine, comprising: means for mounting each engine so that it is movable relative to said aircraft in proportion to the reaction of its jet, throughout the range of said movement; means for regulating the propulsive power of each engine by its said movement, and means for controlling the propulsive power outputs of all engines by the movement of one engine selected as a master, so that said aircraft is propelled at a definite, selected speed, corresponding to the position of said engine relative to said aircraft, throughout the speed range of said aircraft.

12. In an aircraft propelled by multiple jet engines, means for controlling the speed of flight in accordance with the jet reaction thrust of each engine, comprising: means for mounting each engine so that it is movable relative to said aircraft in proportion to the reaction of its jet, throughout the range of said movement; hydraulic means for regulating the propulsive power of each engine by its said movement, and hydraulic means for controlling the propulsive power outputs of all engines by varying the fuel supply to each engine in accordance with the movement of one engine selected as a master, so that said aircraft is propelled at a definite, selected speed, corresponding to the position of said engine relative to said aircraft, throughout the speed range of said aircraft.

13. In an aircraft propelled by multiple jet engines, means for controlling the flight in accordance with the jet reaction thrust of each engine, comprising: means for mounting each engine so that it is movable relative to said aircraft in proportion to the reaction of its jet, throughout the range of said movement; hydraulic means for regulating the propulsive power of each engine in accordance with its said movement, and hydraulic means for equalizing the propulsive power outputs of all engines by varying the fuel supply to each engine in response to the movement of one engine selected as a master, so that said aircraft is propelled at a definite, selected speed, corresponding to the position of said engine relative to said aircraft, throughout the speed range of said aircraft.

14. In an aircraft propelled by a jet engine, means for controlling the speed of flight in accordance with the reaction thrust of the engine jet, comprising; means for mounting the engine so that it is movable relative to said aircraft in proportion to the reaction thrust of its jet, throughout the range of said movement; and means responsive to said movement for automatically regulating the jet thrust of said engine, in accordance with said movement, so that said aircraft is propelled at a definite, selected speed, corresponding to the position of said engine relative to said aircraft, throughout the speed range of said aircraft.

15. In an aircraft propelled by a jet engine, means for controlling the operation of said engine by controlling the fuel supply thereto, comprising: means for mounting said engine so that it is movable with reference to said aircraft in response to the reaction thrust of the engine jet, means for regulating said fuel supply in accordance with the movement of said engine caused by said thrust, and means for modifying said regulation in accordance with the speed and temperature of said engine so that neither exceeds a selected safe value.

16. In an aircraft propelled by multiple jet engines, means for controlling the operation of said engines by controlling the fuel supply thereto, comprising: means for mounting each engine so that it is movable with reference to said aircraft in response to the reaction thrust of its jet, means for automatically regulating said fuel supply to each engine in accordance with the movement of each engine caused by its said thrust, and means for automatically modifying said regulation in accordance with the speed and temperature of each engine so that neither exceeds a selected safe value.

17. In an aircraft propelled by multiple jet engines, means for controlling the operation of said engines by controlling the fuel supply thereto, comprising: means for mounting each engine so that it is movable with reference to said aircraft in response to the reaction thrust of its jet, means for automatically regulating said fuel supply to each engine in accordance with the movement of each engine caused by its said thrust so that all of said jet thrusts are equal, and means for automatically modifying said regulation in accordance with the speed and temperature of each engine so that neither exceeds a selected safe value.

18. In an aircraft propelled by multiple jet engines, means for controlling the operation of said engines by controlling the fuel supply thereto, comprising: means for mounting each engine so that it is movable with reference to said aircraft in response to the reaction thrust of its jet, means for automatically regulating said fuel supply to each engine in accordance with the movement of each engine caused by its said thrust, means for automatically equalizing the jet thrusts of all engines in response to said movement of one engine selected as a master, and means for automatically modifying said regulation in accordance with the speed and temperature of each engine so that neither exceeds a selected safe value.

19. In an aircraft propelled by multiple jet engines, means for controlling the speed and direction of flight of said aircraft by the jet reaction thrusts of said engines, comprising: means for mounting each engine so that it is movable with reference to said aircraft in response to the reaction thrust of its jet, means for automatically regulating the jet thrust of each engine by said movement thereof, means for automatically equalizing the jet thrusts of all engines, and means for automatically compensating each of said regulating means for the forces due to the mass of its engine.

20. A control system for an engine comprising translatory movable mounting means therefor, manual speed control means for said engine, power means for moving the engine on said mounting means, remote control means operatively associated with said manual means for controlling said power means, and means responsive to relative movement of said engine and mounting means to vary the action of said manual control means so that the speed of the engine remains constant regardless of variations in strength of said power means.

21. A control system for a plurality of engines comprising translatory movable mounting means for each of said engines, individual speed control means for said engines, individual power means for moving said engines on their movable mountings, common control means operatively associated with said manual means for controlling said power means, and means associated with each engine and mounting and responsive to movements of each engine relative to its mounting to vary the action of said individual control means so that the speeds of all the engines are equal regardless of variations in the strength of said power means.

References Cited in the file of this patent

UNITED STATES PATENTS

| | | |
|---|---|---|
| 2,088,954 | Gregg | Aug. 3, 1937 |
| 2,103,274 | Sanford | Dec. 28, 1937 |
| 2,219,994 | Jung | Oct. 29, 1940 |
| 2,280,835 | Lysholm | Apr. 28, 1942 |
| 2,284,687 | Schimanek | June 2, 1942 |
| 2,303,317 | Berges | Dec. 1, 1942 |
| 2,397,658 | Goddard | Apr. 2, 1946 |
| 2,411,895 | Poole | Dec. 3, 1946 |
| 2,569,444 | Banning | Oct. 2, 1951 |

FOREIGN PATENTS

| | | |
|---|---|---|
| 453,766 | Great Britain | Sept. 14, 1936 |
| 578,311 | Great Britain | June 24, 1946 |